United States Patent
Hesse et al.

(10) Patent No.: US 9,879,729 B2
(45) Date of Patent: Jan. 30, 2018

(54) CONNECTION OF A TUBULAR DEVICE TO A SHAFT

(71) Applicant: Robert Bosch GmbH, Stuttgart (DE)

(72) Inventors: Juergen Hesse, Waldenbuch (DE); Tobias Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 14/651,199

(22) PCT Filed: Oct. 18, 2013

(86) PCT No.: PCT/EP2013/071818
§ 371 (c)(1),
(2) Date: Jun. 10, 2015

(87) PCT Pub. No.: WO2014/090453
PCT Pub. Date: Jun. 19, 2014

(65) Prior Publication Data
US 2016/0305484 A1    Oct. 20, 2016

(30) Foreign Application Priority Data
Dec. 10, 2012    (DE) .................. 10 2012 222 627

(51) Int. Cl.
*F16D 1/10*    (2006.01)
*F16D 1/108*    (2006.01)
(Continued)

(52) U.S. Cl.
CPC ............ *F16D 1/108* (2013.01); *B24B 45/003* (2013.01); *F16D 1/06* (2013.01); *F16D 1/10* (2013.01);
(Continued)

(58) Field of Classification Search
CPC ......... Y10T 403/7026; Y10T 403/7035; Y10T 403/7047; Y10T 403/7051;
(Continued)

(56) References Cited

U.S. PATENT DOCUMENTS 2,815,229 A * 12/1957 Cook .................... A01B 71/06
                                                    403/356
3,031,641 A *  4/1962 Camzi ................... H01R 13/02
                                                    403/361
(Continued)

FOREIGN PATENT DOCUMENTS

DE          671 920         2/1939
DE      198 10 352 A1       9/1999
(Continued)

OTHER PUBLICATIONS

International Search Report corresponding to PCT Application No. PCT/EP2013/071818, dated Jan. 23, 2014 (German and English language document) (8 pages).

*Primary Examiner* — Jonathan Masinick
(74) *Attorney, Agent, or Firm* — Maginot, Moore & Beck LLP (57) ABSTRACT

A tubular device for connection to a shaft such that a torque can be transmitted between the tubular device and the shaft comprises a hollow receiving region configured to receive a first supporting region of the shaft, and at least one first torque-transmitting section configured to engage with at least one second torque-transmitting section of the shaft. The hollow receiving region includes at least one contact surface configured to engage at least one first supporting region of the shaft when the tubular device is radially mounted to the shaft. The at least one first torque-transmitting section includes at least one bump which, starting from the at least (Continued)

one first contact surface, projects into the hollow receiving region and is positioned immovably on the tubular device.

16 Claims, 9 Drawing Sheets

(51) Int. Cl.
    *F16D 1/06*     (2006.01)
    *B24B 45/00*     (2006.01)

(52) U.S. Cl.
    CPC .. *F16D 2001/102* (2013.01); *F16D 2001/103* (2013.01)

(58) Field of Classification Search
    CPC ......... Y10T 403/7052; Y10T 403/7054; Y10T 403/7058; F16D 1/108; F16D 2001/103; Y10S 464/901; B24B 45/006
    See application file for complete search history.

(56) References Cited

U.S. PATENT DOCUMENTS

| | | | | |
|---|---|---|---|---|
| 3,073,192 A * | 1/1963 | Beers | ................. | B25B 23/0035 403/324 |
| 3,819,288 A * | 6/1974 | Carmien | ................. | B25G 3/02 403/247 |
| 4,367,053 A * | 1/1983 | Stratienko | ............... | F16D 1/094 403/371 |
| 4,824,281 A * | 4/1989 | Katsube | ................. | F16D 1/094 403/369 |
| 5,433,551 A * | 7/1995 | Gordon | ................. | A47H 1/022 16/96 R |
| 5,533,825 A | 7/1996 | Stone | | |
| 5,603,584 A * | 2/1997 | Schuele | ................... | B25G 3/04 15/143.1 |
| 5,779,385 A * | 7/1998 | Fechter | ................... | F16D 1/116 403/325 |
| 5,924,816 A * | 7/1999 | Schuele | ................... | B25G 3/10 403/316 |
| 6,183,230 B1 * | 2/2001 | Beardmore | ......... | F04C 15/0073 403/359.6 |
| 6,386,789 B1 * | 5/2002 | Chausse | ................ | F16B 21/165 403/322.2 |
| 6,446,541 B1 * | 9/2002 | Eriksson | ................... | F16D 1/05 403/367 |
| 7,223,042 B1 * | 5/2007 | Bruder | .................... | E04B 1/585 403/161 |
| 7,488,257 B1 * | 2/2009 | Booker | .................... | F16D 3/06 403/359.1 |
| 2002/0001503 A1 * | 1/2002 | Jager | .................... | F16C 27/063 403/365 |
| 2004/0086330 A1 * | 5/2004 | Gregel | .................... | B25B 27/10 403/314 |
| 2005/0220534 A1 * | 10/2005 | Ober | ..................... | B65H 75/08 403/370 |
| 2005/0248156 A1 * | 11/2005 | Hsieh | ..................... | F16L 21/00 403/367 |
| 2006/0062525 A1 * | 3/2006 | Campbell | ............. | F16G 11/042 385/53 |
| 2008/0000316 A1 * | 1/2008 | Kurokawa | ............. | B62D 1/185 74/493 |
| 2009/0270187 A1 * | 10/2009 | Matsubara | ................ | F16C 3/02 464/143 |
| 2009/0324323 A1 * | 12/2009 | Yamashita | ............... | F16D 1/092 403/16 |
| 2011/0140379 A1 * | 6/2011 | Knieriem | ............... | F16M 11/42 280/29 |
| 2011/0188928 A1 * | 8/2011 | West | ....................... | B23P 11/00 403/291 |
| 2012/0010007 A1 * | 1/2012 | Szuba | .................. | B21D 39/032 464/179 |
| 2012/0108349 A1 * | 5/2012 | Foley | ....................... | F16D 3/06 464/162 |

FOREIGN PATENT DOCUMENTS

| | | | | |
|---|---|---|---|---|
| DE | 10211371 A1 * | 9/2003 | ........... | B24B 45/006 |
| FR | 2 917 473 A1 | 12/2008 | | |
| FR | 2 918 726 A1 | 1/2009 | | |
| WO | 2012/052242 A2 | 4/2012 | | |

* cited by examiner

CONNECTION OF A TUBULAR DEVICE TO A SHAFT

This application is a 35 U.S.C. § 371 National Stage Application of PCT/EP2013/071818, filed on Oct. 18, 2013, which claims the benefit of priority to Serial No. DE 10 2012 222 627.3, filed on Dec. 10, 2012 in Germany, the disclosures of which are incorporated herein by reference in their entirety.

The disclosure is related to a tubular device for connection to a shaft.

BACKGROUND

From connections with adjustment springs, tubular devices for the connection to a shaft such that a torque can be transmitted between a tubular device and the shaft are known, wherein the tubular device has a hollow receiving region for receiving a first supporting region of the shaft, wherein the receiving region has at least one first contact surface for the radial mounting on at least one first supporting region of the shaft, and wherein the tubular device has at least one torque-transmitting section which is provided in order to come into engagement with at least one torque-transmitting section of the shaft. As a result, high torques can be transmitted.

For the mounting, the adjustment spring is customarily inserted into a groove in the shaft and this assembly is pushed into the tubular device. Care has to be taken here to ensure that the shaft is oriented in such a manner that the adjustment spring does not drop out.

SUMMARY

By contrast, the tubular device for connection to a shaft with the features of the embodiments of the disclosure has the advantage that mounting is simplified.

This is achieved by a tubular device for connection to a shaft such that a torque can be transmitted between the tubular device and the shaft, wherein the tubular device has a hollow receiving region for receiving a first supporting region of the shaft, wherein the receiving region has at least one first contact surface for the radial mounting on at least one first supporting region of the shaft, wherein the tubular device has at least one torque-transmitting section which is provided for coming into engagement with at least one torque-transmitting section of the shaft, and wherein the at least one torque-transmitting section of the tubular device is at least one bump which, starting from the contact surface, projects into the hollow receiving region and is arranged immovably on the tubular device.

Advantageous developments and improvements of the tubular device are disclosed herein.

In an advantageous development, the at least one bump is designed as a web running along the inner circumference and in the longitudinal direction of the tubular device and is formed preferably integrally with the device. A simple construction is thereby possible.

In a preferred development, the at least one bump, designed in particular as a web, runs over at least part of the overall length of the tubular device.

In a further preferred embodiment, the at least one bump, designed in particular as a web, comprises a main section which is at a distance from an end side of the tubular device and has a length, wherein the length runs preferably only over part of the overall length of the tubular device.

In a further preferred development, the at least one bump, designed in particular as a web, begins at the transition from a first end side to the hollow receiving region of the tubular device, wherein the transition is preferably provided with a hollow.

If a groove running in the longitudinal direction of the device is formed in the surface, facing the center axis, of the at least one bump, designed in particular as a web, said groove running over part of the length of the at least one bump, designed in particular as a web, and the depth of said groove being preferably smaller than the height of the at least one bump, designed in particular as a web, then, after the tubular device is mounted on a shaft, a securing device for securing the tubular device on the shaft can be arranged therein.

A defined stop for the securing device can be realized in that the groove ends in a wall, wherein the wall runs in particular in a plane which lies perpendicularly to the longitudinal direction of the tubular device.

A blocking device of the securing device can be arranged particularly easily in the tubular device in that a ramp is formed in the main section, the ramp being inclined in such a manner that it goes away from the center axis of the tubular device at increasing distance from the end side and merges into the contact surface preferably via a step.

The tubular device can be securely held on the shaft if the at least first contact surface has a constant diameter over the length thereof up to the region with the at least one elevation, designed in particular as a web, and if in particular the first contact surface is directly or indirectly adjoined by a second contact surface which preferably has a constant diameter.

A higher torque can be realized if at least two, in particular three, preferably four elevations designed in particular as webs are arranged on the inner circumference and divide the contact surface preferably into partial surfaces of identical size. In addition, this permits a coding of devices with a different number of bumps in different power categories in each case.

If at least one blocking device against mounting the tubular device with the wrong orientation is provided on the inner circumference of the tubular device, said blocking device preferably being formed at an end of the tubular device that is opposite an end of the tubular device that is provided as a mounting opening, the correct orientation for the mounting can easily be identified.

A compact design of a shaft to which a quite high torque can be transmitted is produced if the contact surface of the hollow receiving region has a diameter of 11.8 mm, and the at least one bump designed in particular as a web has in each case a width of 4.95 mm, wherein preferably diametrically opposite webs are at a distance of 8.65 mm.

A main section which has a length of 14.95 mm is particularly appropriate for this purpose.

In a preferred development, the tubular device is an injection molded plastics part, wherein preferably no mold release slope is formed on the at least first contact surface.

Diverse use possibilities arise from the fact that the tubular device comprises a tool which is preferably designed as a roller, saw or grinding wheel, or that the tubular device comprises an adapter for a further tool, or that the tubular device comprises an adapter for a further tool, and also the further tool.

BRIEF DESCRIPTION OF THE DRAWINGS

Exemplary embodiments of the disclosure are illustrated in the drawings and explained in more detail in the description below, in which.

DETAILED DESCRIPTION

Figure 1:
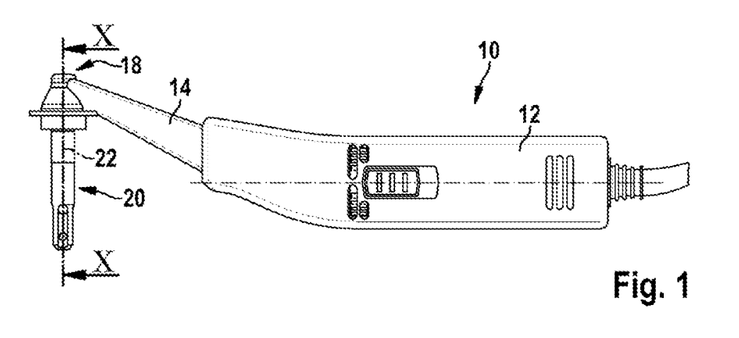
FIG. 1 shows a machine tool with a first exemplary embodiment of a shaft.

FIG. 1 shows a main device designed as a hand-held machine tool 10, as disclosed, for example, in WO 2012/052242 A2. However, the machine tool 10 can also be designed as a machine tool which is stationary or is semi-stationary, i.e. suitable for carrying on construction sites. The machine tool 10 is designed as a power unit, but a battery-operated design is also conceivable. The machine tool 10 can be used, for example, as a roll grinder or else saw with a rotating and/or oscillating output.

The machine tool 10 has a housing 12 in which a drive motor (not illustrated) is arranged. The housing 12 has an elongated shape and can be held with one hand or two hands. An elongate, hollow neck 14 is arranged at one end of the housing. The longitudinal axis of the neck 14 is slightly inclined with respect to the longitudinal axis of the housing 12. However, the longitudinal axis of the neck 14 can also be arranged more steeply than, in parallel to or in alignment with the longitudinal axis of the housing 12. A transmission shaft 16 (indicated in FIGS. 4 and 5) or a differently designed transmission element, for example a belt, is arranged in the neck 14. An output head 18 is formed at that end of the neck 14 which is remote from the housing 12. The output head 18 can also be arranged directly on the housing 12. In this case, a neck 14 would not be present. It is also possible for an output head 18 not to be present.

A shaft 20 designed as an output shaft is arranged in the output head 18 by means of a receptacle 19. The shaft 20 can be fastened in the receptacle 19 in such a manner that destruction-free removal is no longer possible. However, it is preferred that the shaft 20 is arranged removably in the receptacle 19 for maintenance or repair purposes. The central longitudinal axis or longitudinal axis 22 of the shaft 20 runs perpendicularly to the longitudinal axis of the housing 12 and forms a plane with said longitudinal axis. However, the longitudinal axis 22 of the shaft 20 can also run at a different angle with respect to the longitudinal axis of the housing 12 and/or so as not to form a plane with said longitudinal axis. The shaft 20 is drivable in a rotatory and/or oscillating manner. An axial movement, such as, for example, in the manner of a jigsaw, is also possibly conceivable. The axial movement can also be combined with the rotatory and/or oscillating movement. It is also conceivable that the shaft 20 is not driven via the transmission shaft 16, but rather drives the transmission shaft 16. The machine tool 10 or a differently designed main device, for example a dynamo, can also be driven in this case.

Figure 2:
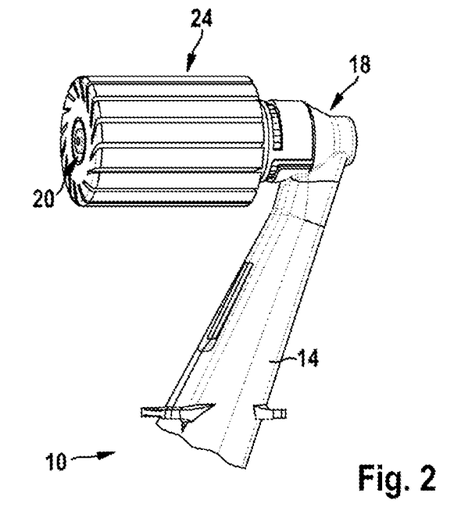
FIG. 2 shows a partial view of the machine tool from FIG. 1 with a grinding roller mounted on the shaft.
Figure 3:
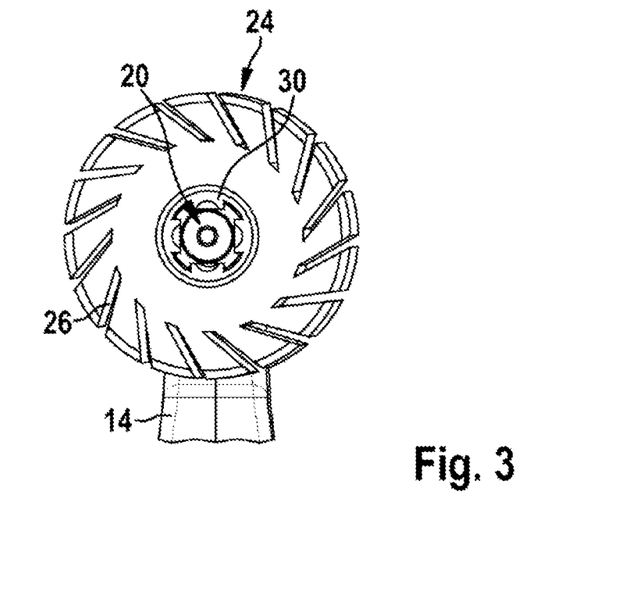
FIG. 3 shows a side view from the left and a view of the end side of the grinding roller and the shaft according to FIG. 2.

FIGS. 2 and 3 show a roller 24 mounted on the machine tool 10 or on the shaft 20. The roller 24 is mounted on the shaft 20 by means of a tubular device designed as a sleeve 30. The shaft 20 therefore serves for the rotational coupling of the machine tool 10 to the sleeve 30, and therefore a torque can be transmitted between the machine tool 10 and the sleeve 30.

In the present exemplary embodiment, the roller 24 is made from rubber. An abrasive paper belt or polishing belt (not shown) can be fastened on the roller 24. Slots 26 running in the longitudinal direction are formed on the circumference of the roller 24. However, instead of the roller 24 which is shown, a different tool can also be provided, for example a lamella grinder, a brush in the form of a wire brush, nylon brush or "Fladder" brush. Instead of the roller 24, a saw blade, a saw blade segment, another disc serving, for example, for grinding, or a disc segment can also be provided.

The roller 24 is arranged on the tubular device designed as the sleeve 30. The roller 24 can be an individual component or an assembly. The sleeve 30 can likewise be an individual component or an assembly. However, in the present exemplary embodiment, the roller 24 and the sleeve 30 are formed as a single part, as taken on their own in each case. It should be emphasized that the sleeve 30 can also be an integral part of the roller 24 and the roller 24 can be an integral part of the sleeve 30. If the roller 24 and the sleeve 30 are separate components or assemblies, the roller 24 can be fastened on the sleeve 30 removably or non-removably. In the case of a removable fastening, the roller 24 can be fastened on the sleeve 30 by press fit, screw connection, latching connection or quarter-turn connection. In the case of a fastening which is not provided for the removal, the roller 24 can be adhesively bonded, ultrasonically welded and/or pressed onto the sleeve 30. However, the last-mentioned fastenings can also be designed in such a manner that the roller 24 and sleeve 30 are nevertheless releasable again from each other without having to be destroyed. The roller 24 and the sleeve 30 can also be potted or insert molded with each other. For example, the roller can be made from plastic and the sleeve 30 from metal, or vice versa, wherein the plastic is applied to the metal by means of a plastics injection molding process. The two components can also be made from plastic or metal or another suitable material. In the present exemplary embodiment, the sleeve 30 is designed as a plastics injection molded part.

Figure 4:
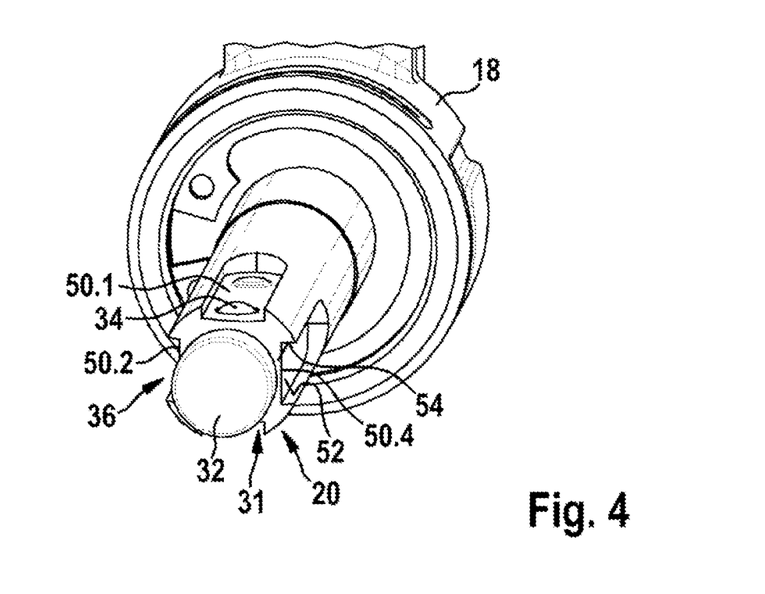
FIG. 4 shows a perspective view of the shaft without the grinding roller.
Figure 5:
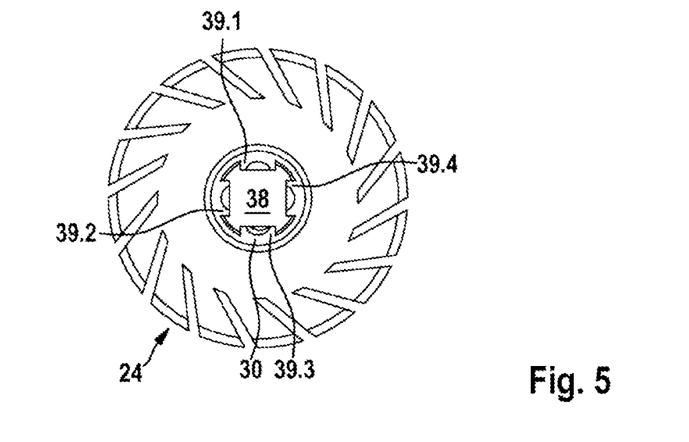
FIG. 5 shows an end view of the grinding roller without the shaft.

FIG. 4 shows a first, free end 31 of the shaft 20 in an end view, and FIG. 5 shows the roller 24 together with the sleeve 30 in an end view. Mutually corresponding cross-sectional surfaces of the shaft 20 and of the sleeve 30 can readily be seen. As a result, it can be ensured that sleeves 30 which are provided only for mounting on the shaft 20 can be mounted on the shaft 20.

It is likewise also clear from FIG. 4 that a cap 32 is arranged on the end side of the first end 31 of the shaft 20. In addition, a blocking device designed as a ball 34 is provided, wherein the cap 32 and ball 34 are part of a securing device 36. The securing device 36 serves at least for axially securing the sleeve 30 on the shaft 20 following the mounting. For the mounting, the shaft 31 can be introduced with the first end 31 in front into the sleeve 30; the first end 31 is therefore the free end of the shaft 20. The shaft 20 together with the cap 32 and the ball 34 can be introduced here together into a hollow receiving region 38 (shown in FIG. 5) of the sleeve 30, which facilitates the mounting. Four inwardly directed webs 39 which run in the longitudinal direction of the receiving region 38 and of the sleeve 30 are advantageously formed in the hollow receiving region 38.

Figure 6:
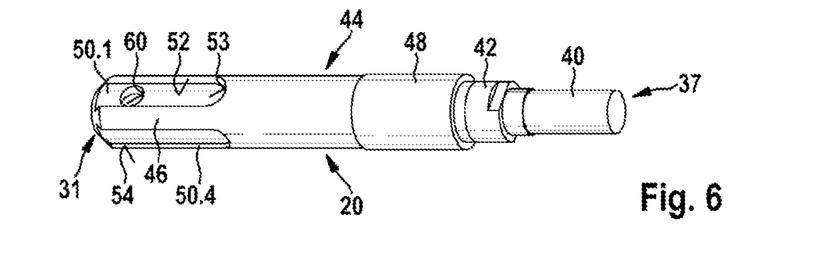
FIG. 6 shows a side view of the shaft by itself.
Figure 7:
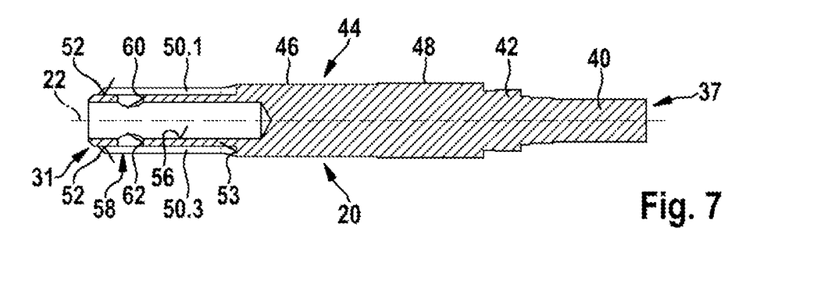
FIG. 7 shows a longitudinal section through the shaft.

In addition to FIG. 4, FIGS. 6 and 7 show further details of the shaft 20. The shaft 20 preferably has a length of 89.6 mm. It should be emphasized that this dimension and also the following dimensions can include customary manufacturing tolerances of up to a few tenths of millimeters. The shaft 20 comprises a journal 40, a stepped intermediate region 42 and a mounting region 44. The journal 40 is provided at the second end 37 which faces away from the first end 31. The journal 40 preferably has a length of 15 mm and a diameter of 7 mm. The journal 40 is mounted in the receptacle 19 preferably via an interference fit. The shaft 20 is fastened to the machine tool 10 or output head 18 by the journal 40. The journal 40 of the shaft 20 is adjoined by a stepped intermediate region 42 with a length of preferably 11 mm, which intermediate region forms a transition from the diameter of the journal 40 to the comparatively larger diameter of the mounting region 44. The sleeve 30 is arranged on said mounting region 44.

The mounting region 44 preferably has a length of 63.5 mm. Starting from the first end 31, a first supporting region 46 is provided on the mounting region 44 and along the outer circumference of the shaft 20, said supporting region 46 being arrangeable in the hollow receiving region 38 of the sleeve 30 when the sleeve 30 is mounted on the shaft 20. The first supporting region 46 has a length of 48.4 mm and a diameter of preferably 11.7 mm. A second supporting region 48 is preferably formed between the first supporting region 46 and the intermediate region 42. The second supporting region 48 has a somewhat larger diameter than the first supporting region 46 of preferably 12.1 mm. The diameters of the supporting regions 46 and 48 are preferably manufactured particularly precisely.

Starting from the first end 31 of the shaft 20, four grooves 50.1, 50.2, 50.3, 50.4 which are offset by 90° in each case run on the outer circumference of said shaft parallel to the longitudinal axis 22 or in the longitudinal direction of the shaft 20. These grooves 50.1, 50.2, 50.3, 50.4 constitute torque-transmitting sections of the shaft 20. In the present exemplary embodiment, four grooves 50.1, 50.2, 50.3, 50.4 are provided, which is advantageous for the mounting. However, it is also conceivable for two, three or more than four grooves 50.1, 50.2, 50.3, 50.4 to be formed on the outer circumference of the shaft 20. For example, a different number of grooves 50.1, 50.2, 50.3, 50.4 can be provided for different power classes of machine tools 10, when more grooves 50.1, 50.2, 50.3, 50.4 are provided for higher power classes. At the higher power classes, it is possible, for example, for a higher torque to be transmitted.

In the present exemplary embodiment, the grooves 50.1, 50.2, 50.3, 50.4 have a rectangular cross-sectional area. The grooves 50.1, 50.2, 50.3, 50.4 have a width of preferably 5.2 mm and a length of 23.8 mm. The distance of a groove base 52 of a first groove 50.1 or 50.2 from the groove base 52 of a second, diametrically opposite groove 50.3 or 50.4 is preferably 8.5 mm. In other words, the wrench size of two diametrically opposite groove bases 52 is preferably 8.5 mm. The distance of a groove base 52 of a groove 50.1, 50.2, 50.3, 50.4 from the longitudinal axis 22 of the shaft 20, wherein the longitudinal axis 22 in this case means the center axis of the shaft 20, is therefore around 4.25 mm. Since the width of the grooves 50.1, 50.2, 50.3, 50.4, is 5.2 mm and the diameter of the first supporting region 46 is 11.7 mm, the proportion of the width to the diameter is around 44%. It has proven advantageous when the proportion of the width of the grooves 50.1, 50.2, 50.3, 50.4 to the diameter of the first supporting region 46 is 30 to 60%, preferably 40 to 50%. This produces a compact construction and low surface pressure. A good torque can therefore also be transmitted in particular to a sleeve 30 made from plastic without the surface pressure becoming too great.

At the groove end 53 of said grooves that is opposite the first end 31 of the shaft 20, the side surfaces 54 of the grooves 50.1, 50.2, 50.3, 50.4 preferably form a semicircle, the radius of which corresponds to half of the width of the grooves 50.1, 50.2, 50.3, 50.4. This is the preferred embodiment with regard to manufacturing and mounting. However, the grooves 50.1, 50.2, 50.3, 50.4 can also be designed in such a manner that the groove base 52 peters out in an arc of a circle with respect to the outer circumference of the groove 20. Instead of the first-mentioned semicircular groove end 53, a side running perpendicularly to the side surfaces 54 and groove base 52 could also be provided. It is also possible for the side surfaces 54 of the grooves 50.1, 50.2, 50.3, 50.4 not to run parallel to one another, as shown, but rather to be inclined with respect to one another. The grooves 50.1, 50.2, 50.3, 50.4 can each therefore also have a different cross-sectional areas—for example, a trapezoidal cross-sectional area, in particular in the form of a dovetail, or a triangular or rounded cross-sectional area.

Starting from the end side of the first end 31, an axial recess designed as a longitudinal bore 56 is provided in the shaft 20. The longitudinal bore 56 preferably has a diameter of 6.05 mm. However, it can also have a stepped or conical profile. The longitudinal bore 56 is a blind bore with a conical end. However, it can also be designed as a flat base blind bore. The longitudinal bore 56 can also be designed as a through bore with a constant, conical or stepped diameter. In addition to the round cross-sectional area, another cross-sectional area, for example a polygonal or oval cross-sectional area, can also be provided.

At a distance of 6.8 mm from the end side of the ends 31 of the shaft 20, a lateral recess which is designed as a transverse bore 58 and extends from the groove 50.1 to the groove 50.3 is provided perpendicularly to the longitudinal bore 56 or the longitudinal axis 22. The transverse bore 58 has a first opening 60 and a second opening 62 on the outer circumference of the shaft 20. The second opening 62 is preferably larger than the first opening 60. The second opening 62 preferably has a diameter of 4.1 mm, and the first opening 60 on the groove base 52 has a diameter of 3.65 mm. The opening 60 is formed in the groove base 52 of the groove 50.1 and the second opening 62 is formed in the groove base 52 of the diametrically opposite groove 50.2. However, it is also possible for the transverse bore 58 together with the openings 60, 62 thereof to be formed at a different location on the shaft 20. The second opening 60 is smaller because a drill with a conical point, coming from the second opening 62, is not entirely guided through the groove base 52 of the groove 50.1 during the production. This results in a section of the first opening 60 that encases the side surface of a truncated cone. As a result, a part of the ball 34, which preferably has a diameter of 4 mm for this purpose, or a differently designed blocking device projects out of the first opening 60, but the ball 34 is secured against dropping out. However, this can also be achieved by the fact that only the first opening 60 is provided. It is also conceivable for the opening 60 to be drilled with a diameter which permits the ball 34 to be inserted. After the insertion, the first opening 60 is then calked. Instead of one transverse bore 58 or one first opening 60, it is also possible to provide a plurality of transverse bores 58 or first openings 60 which are arranged, for example, axially one behind another. Preferably, however, just one transverse bore 58 or first opening 60 is provided.

Figure 11:
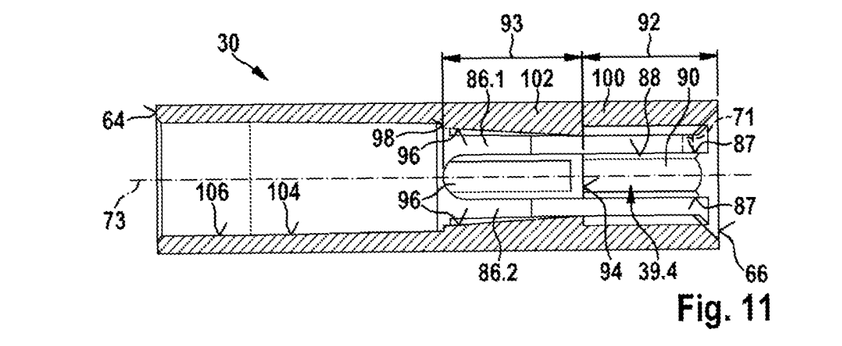
FIG. 11 shows a longitudinal section through the sleeve according to the intercepting line XI in FIG. 9.
Figure 12:
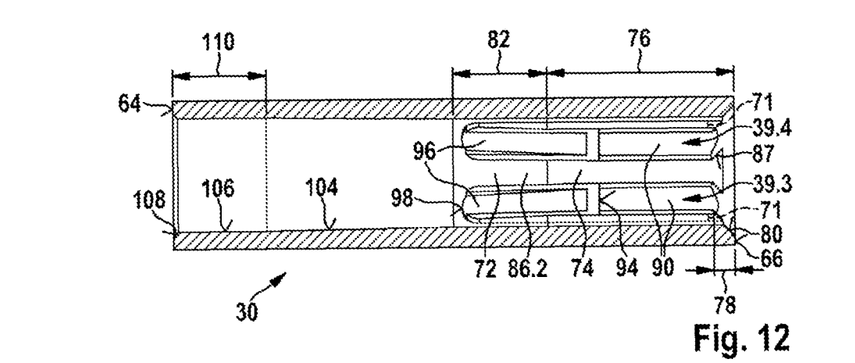
FIG. 12 shows a longitudinal section through the sleeve according to the intercepting line XII in FIG. 9.
Figure 13:
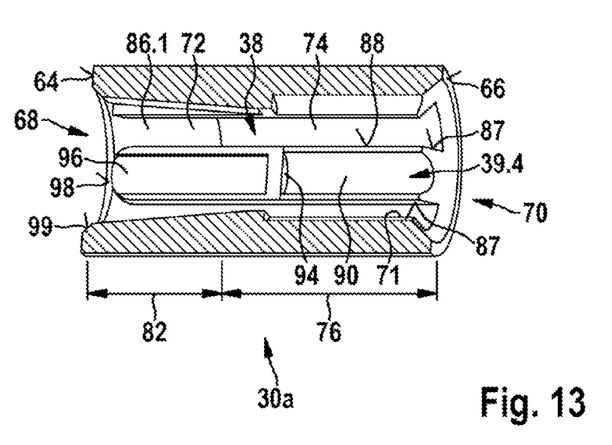
FIG. 13 shows a perspective longitudinal section through a shortened sleeve.

FIGS. 8 to 12 show further details of the sleeve 30. A sleeve 30*a* which is shortened in comparison to the sleeve 30 and is shown in FIG. 13 is also already referred to. Parts, regions or sections of the shortened sleeve 30*a* that are identical to the sleeve 30 according to FIGS. 8 to 12 are provided with the same reference numbers.

As already explained, the sleeve 30 is a tubular device for connection to the shaft 20, and therefore a torque can be transmitted by means of the shaft 20 between the machine tool 10—or a differently designed main device—and the sleeve 30. In the present exemplary embodiment, the torque is transmitted to the roller 24 by the sleeve 30. In contrast to a disc-shaped device, a tubular device is distinguished in that the length of the tubular device is greater than the diameter. In particular, the length of a tubular device or of the sleeve 30 is greater than the inside diameter thereof, which will also be discussed in detail. The shaft 20 and the securing device 36 therein can therefore be formed in a manner saving on space radially. In addition, a roller 24 can be securely attached to the tubular device or sleeve 30 since a larger supporting surface is produced. However, even in the case of a sleeve 30 and roller 24 of integral design, significantly lower loadings of the material due to, for example, surface pressure and/or shearing stresses arise.

The sleeve 30 has a length of 60 mm. The outer circumference is substantially cylindrical and has an outside diameter of 16.05 mm. The sleeve 30 has at least one hollow receiving region 38 for the first and second supporting regions 46, 48 of the shaft 20.

Alternatively, two receiving regions 38 which run in parallel and into which two parallel shafts 20 are inserted could also be provided. However, the simple design is preferred.

The hollow receiving region 38 preferably extends over the entire length of the sleeve 30 and is advantageously open on the two end sides—or ends—64 and 66 of the sleeve 30. A mounting opening 68 of the hollow receiving region 38 or of the sleeve 30 is located on the first end side 64. An operating opening 70 of the hollow receiving region 38 or of the sleeve is located on the second end side 66. For the mounting of the sleeve 30 or of a roller 24 or another device on the shaft 20, the sleeve 30, with the mounting opening 68 in front, is placed onto the shaft 20, which is also discussed in greater detail.

In the region of the operating opening 70 or in the vicinity of the second end side 66, two bumps in the form of wall sections 71 which reach into the hollow receiving region 38 are indicated by dashed lines on the inner circumference of the sleeve 30. However, said wall sections 71 can also be omitted. It is also possible for only one wall section 71 or more than two to be provided. It is also possible for a number of wall sections 71 corresponding to three, four or up to another number of webs 39.1, 39.2, 39.3, 39.4 to be provided. The wall sections 71 serve as blocking sections against mounting the sleeve 30 with the wrong orientation, that is to say, onto the shaft 20 with the operating opening 70 in front.

The wall sections 71 are at a smaller distance from the longitudinal center axis or longitudinal axis 73 of the sleeve 30 than the radius of the first supporting region 46 of the shaft 20. The wall sections 71 are formed between two adjacent webs 39.1 and 39.4 and also 39.2 and 39.3. They preferably have an extent of 1-2 mm in the longitudinal direction of the sleeve 30. The wall sections 71 are located adjacent to the second end side 66 or at the beginning there of the webs 39.1, 39.2, 39.3, 39.4. Instead of the wall sections 71 formed between the webs 39.1 and 39.4 and also 39.2 and 39.3, differently shaped elevations can also be provided as blocking devices against mounting the sleeve 30 with the wrong orientation. For example, the side surfaces 54 of the grooves 50.1, 50.2, 50.3, 50.4 can taper in the direction of the groove ends 53, and the webs 39.1, 39.2, 39.3, 39.4 can have a geometry which is adapted thereto by said webs likewise becoming narrower in the direction of the mounting opening 68. The profile here can be continuous or with steps.

Figure 8:
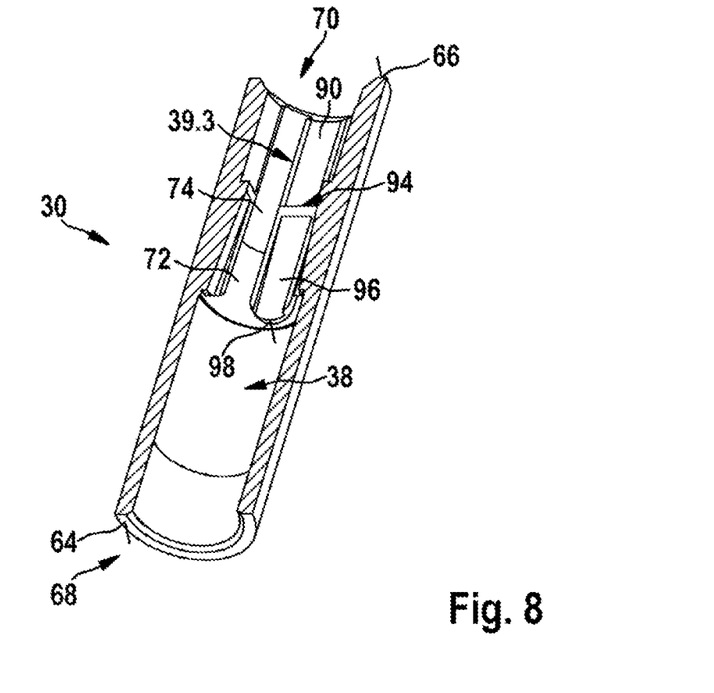
FIG. 8 shows a perspective longitudinal section through a sleeve according to the intercepting line VIII in FIG. 9.
Figure 9:
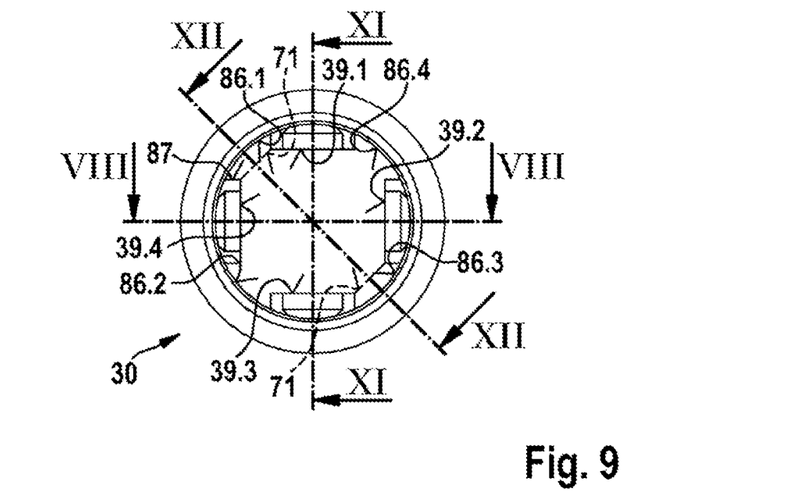
FIG. 9 shows a first end side of the sleeve.
Figure 10:
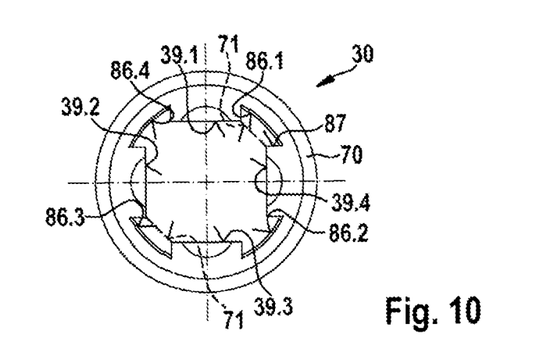
FIG. 10 shows the second end side of the sleeve.

The receiving region 38 of the sleeve 30 has at least one first contact surface 72 for the radial mounting on the first supporting region 46 of the shaft 20. The contact surface 72 can emerge directly from the second end side 66 of the sleeve 30. However, in the present exemplary embodiment, an intermediate region 74 which has a somewhat larger inside diameter is formed between the first end side 66 and the contact surface 72. The intermediate region 74 emerges from the second end side 66 and has a length 76 of 20 mm minus the resulting length 78 of a hollow 80 formed in the end side 66. The hollow 80 encloses an angle of 90°. The contact surface 72 has an inside diameter of 11.8 mm and extends over a length 82 of 10 mm. If the sleeve 30 is designed as an injection molded part, there is preferably no mold release slope on the contact surface 72.

Starting from the end side 66 or the end of the hollow 80, four bumps which are distributed uniformly on the inner circumference and are designed as walls or webs 39.1, 39.2, 39.3, 39.4 run in the longitudinal direction in the sleeve 30. The webs 39.1, 39.2, 39.3, 39.4 are therefore arranged offset by 90° with respect to one another. The webs 39.1, 39.2, 39.3, 39.4 divide the contact surface 72 into partial surfaces 86.1, 86.2, 86.3, 86.4 which are preferably identical in size. Since the webs 39.1, 39.2, 39.3, 39.4 do not reach in the longitudinal direction entirely as far as the contact surface 72, the partial surfaces 86.1, 86.2, 86.3, 86.4 are also connected to one another at the ends thereof pointing in the direction of the first end side 64 via a strip on the inner circumference of the sleeve 30. Instead of the preferred uniform distribution of the webs 39.1, 39.2, 39.3, 39.4 on the inner circumference of the sleeve 30, other distributions are also possible. Instead of the four webs 39.1, 39.2, 39.3, 39.4, a different number can also be provided. Therefore, at least two, in particular three, preferably four webs 39.1, 39.2, 39.3, 39.4 can be arranged on the inner circumference. One web 39.1, 39.2, 39.3, 39.4 by itself is also possible. More than four webs 39.1, 39.2, 39.3, 39.4, for example five, six, seven, eight or more webs, can likewise be provided; however four are preferred.

It is therefore at least provided that the sleeve 30 has at least one torque-transmitting section, preferably in the form of a wall or a web 39.1, 39.2, 39.3, 39.4, which can be brought into engagement with at least one a torque-transmitting section, preferably in the form of a groove 50.1, 50.2, 50.3, 50.4 of the shaft 20. The webs 39.1, 39.2, 39.3, 39.4 are bumps of the sleeve 30, which bumps emerge from the contact surface 72 and project into the hollow receiving region 38. Instead of bumps of the sleeve 30 in the form of the webs 39.1, 39.2, 39.3, 39.4, differently shaped walls or wall sections can also be provided as torque-transmitting sections. It also suffices when at least one such bump of the sleeve 30 is provided. The at least one bump is preferably formed integrally with the sleeve 30. It is accordingly an integral part of the sleeve 30. The sleeve 30 together with the at least one bump or the at least one web 39.1, 39.2, 39.3, 39.4, wherein, preferably, four bumps or four webs 39.1, 39.2, 39.3, 39.4 are provided, is preferably produced in an injection molding operation. It is also possible for one web or for a plurality of webs 39.1, 39.2, 39.3, 39.4 to be produced from a different material than the remaining sleeve 30. For example, metal can be provided as the material for the web or the webs 39.1, 39.2, 39.3, 39.4, said metal being inserted as an insert into a plastics injection molding die and being insert molded with the material of the sleeve 30. It is also possible for the web or the webs 39.1, 39.2, 39.3, 39.4 to be pressed into recesses in the wall of the sleeve 30. Furthermore, it is also conceivable for the web or the webs 39.1, 39.2, 39.3, 39.4 to be adhesively bonded into the sleeve 30 or recesses of the sleeve 30. Fastening of the web or of the webs 39.1, 39.2, 39.3, 39.4 in the sleeve 30 or in recesses of the sleeve 30 by means of ultrasonic welding is also possible. Of course, it is possible for the web or the webs 39.1, 39.2, 39.3, 39.4 to be able to be released from the sleeve 30 without destroying the sleeve or the web or the webs 39.1, 39.2, 39.3, 39.4. The various formations result in the web or the webs 39.1, 39.2, 39.3, 39.4 or a differently designed bump being held immovably in the sleeve 30. As a result, simple mounting of the sleeve 30 on the shaft 20 is possible.

In addition, the web or the webs 39.1, 39.2, 39.3, 39.4 or a differently designed bump is or are captive.

The webs 39.1, 39.2, 39.3, 39.4 have parallel side walls 87 with a width of 5.05 mm. Between the side walls 87, surfaces 88 are formed in the webs 39.1, 39.2, 39.3, 39.4. The distance between the surfaces 88 of two diametrically opposite webs 39.1, 39.2, 39.3, 39.4 is preferably 8.65 mm. The distance of a web 39.1, 39.2, 39.3, 39.4 or of the surface 88 of a web 39.1, 39.2, 39.3, 39.4 from the center axis of the sleeve 30 is 4.325 mm. As already mentioned, the contact surface 72 has an inside diameter of 11.8 mm. A proportion of the distance of a web 39.1, 39.2, 39.3, 39.4 from the longitudinal axis 73 of the sleeve 30 to the diameter of the contact surface is therefore around 37%. This results in a compact radial construction of the sleeve 30. Advantageous values for the proportion of the distance of a web 39.1, 39.2, 39.3, 39.4 from the longitudinal axis 73 of the sleeve 30 to the diameter of the contact surface 72 also lie between 25 to 50%, in particular 30 to 45%, preferably 35 to 40%. The width of the webs 39.1, 39.2, 39.3, 39.4 of 5.05 mm results in a proportion of around 43% to the diameter, which is 11.8 mm, of the first contact surface 72. This proportion in combination with the proportion of distance of the web 39.1, 39.2, 39.3, 39.4 from the inside diameter of the mounting surface 72 results in a favorable cross-sectional area of the web 39.1, 39.2, 39.3, 39.4, wherein further recesses can also be formed in the cross-sectional area of the webs 39.1, 39.2, 39.3, 39.4, which will also be discussed below. Furthermore, good values for the cross-sectional area of the web or of the webs 39.1, 39.2, 39.3, 39.4 are produced when the proportion of the width of the web or of the webs 39.1, 39.2, 39.3, 39.4 to the diameter of the first contact surface 72 is between 30 and 60%, in particular 40 and 50, preferably 40 and 45%.

The webs 39.1, 39.2, 39.3, 39.4 are 29.35 mm in length. They therefore extend over at least part of the overall length of the sleeve 30. The webs 39.1, 39.2, 39.3, 39.4 begin at the transition from the first end side 64 to the hollow receiving region 38 of the sleeve 30, which receiving region, as shown in the present exemplary embodiment, is preferably provided with the hollow 80. Instead of the parallel side walls 87 which are shown, the latter can also be inclined with respect to one another, and therefore the webs 39.1, 39.2, 39.3, 39.4 also have a trapezoidal or triangular cross-sectional area on the outer sides thereof. The webs 39.1, 39.2, 39.3, 39.4 can also be rounded. The length of the webs 39.1, 39.2, 39.3, 39.4 of 29.35 mm means that said webs are around 2.5 times as long as the diameter of the first mounting surface 72. This results in a particularly favorable surface pressure for the size of the side walls 87. Further advantageous values are produced when the length of the webs 39.1, 39.2, 39.3, 39.4 is twice to three times as long as the diameter of the first mounting surface 72.

A groove 90 running in the longitudinal direction of the sleeve 30, preferably parallel to the longitudinal axis 73, is in each case formed in the surface 88 of the webs 39.1, 39.2, 39.3, 39.4, which surface faces the center axis of the sleeve 30. The groove 90 has a length 92 of 14.4 mm. The groove 90 which runs over part of the length of the web 39 and the depth of which is preferably smaller than the height of the web 39.1, 39.2, 39.3, 39.4 preferably has a rounded cross-sectional area. The radius of the rounding is 1 to 5 mm, preferably 1 to 3 mm. Particularly preferably, the radius is 2 mm and is therefore half the diameter of the ball 34. The size of the groove 90 is selected in such a manner that a flat residual area of the surface 88 still remains, the width of which residual area is preferably 0.5 to 1 mm in each case.

The groove 90 ends in a wall 94 which preferably runs in a plane which is perpendicular to the longitudinal axis 73 of the sleeve 30. The wall 94 therefore preferably forms a stop for the ball 34 or for another securing device 36 arranged on the shaft 20. Instead of the flat wall 94 shown, the end of the groove 90 can also be designed in the same manner as the groove end 53.

The length 93 of the respective web 39.1, 39.2, 39.3, 39.4 or of the webs 39.1, 39.2, 39.3, 39.4 is 14.95 mm from the wall 94 as far as the end of the web facing away from the end side 66. More generally, the length 93 of the web 39.1, 39.2, 39.3, 39.4 is 14.95 mm from the end of the groove 90 as far as the end thereof facing away from the end side 66, which can easily be produced even with walls 94 which are not flat. This results in the already mentioned overall length of the web 39.1, 39.2, 39.3, 39.4 of 29.3 to 29.4 mm. However, the accuracy of the length 93 is preferably greater than the overall length.

The groove 90 or the wall 94 is adjoined by a ramp 96 which preferably runs in the groove 39.1, 39.2, 39.3, 39.4 and is inclined in such a manner that it goes away from the center axis of the sleeve 30. The width of the ramp 96 is 2 to 5 mm, preferably 3 to 4 mm. As a result, two residual areas of the surface 88 of the respective web 39.1, 39.2, 39.3, 39.4 still remain to the side of the ramp 96, as seen in the longitudinal direction. A step 98 is formed between the end of the ramp 96, which end also forms that end of the web 39.1, 39.2, 39.3, 39.4 which is remote from the first end side 64, and the contact surface 72. The step 98 is produced from the petering-out side walls 87 which are rounded at the end with a radius which corresponds to half the width of the webs 39.1, 39.2, 39.3, 39.4, i.e. 2.5 mm. Instead of the oblique ramp 96 shown, a stepped ramp can also be provided. It is also possible for there not to be a ramp 96. In this case, the web 39.1, 39.2, 39.3, 39.4 can have a uniformly flat surface 88.

The length 92 of the groove 90 and the length 93 subdivide the respective web 39.1, 39.2, 39.3, 39.4 in the longitudinal direction of the sleeve 30 into a secondary section 100 and a main section 102. The secondary section 100 extends over the length 92 or runs along the groove 90. The main section 102 extends over the length 93. The main section 102 therefore also has a length 93 of 14.95 mm. The main section 102 which, in the exemplary embodiment shown, directly adjoins the secondary section 100 is at a distance of 14.4 mm from the second end side 66 of the sleeve 30. It is also possible for the secondary section 100 of the webs 39.1, 39.2, 39.3, 39.4 to be omitted. Of the webs or a web 39.1, 39.2, 39.3, 39.4, only the respective main section 102 would therefore be present. At a length of 14.95 mm, a proportion of the diameter, which is 11.8 mm, of the mounting surface 72 of around 1.27 is produced. This proportion still remains favorable for the resulting surface pressure on the side walls 87. Further advantageous values are produced when the proportion of the length of the main section 102 to the diameter of the first contact surface 72 is between 1 and 1.5, preferably between 1.2 and 1.3.

As already mentioned, the previous description with regard to the sleeve 30 according to FIGS. 8 to 12 also applies to the shortened sleeve 30a of FIG. 13. With regard to the sleeve 30a, reference is therefore expressly made to this description in order to avoid unnecessary repetitions. Reference numbers which do not occur in FIG. 13 but have been previously mentioned with regard to FIGS. 8 to 12 also ensue directly and unambiguously with regard to FIG. 13. The sleeve 30a has a length of 30 mm in relation to the sleeve 30. At the transition of the first end side 64 to the contact surface 72, the sleeve has a hollow 99. The volume of the sleeve 30a is preferably 3.18 cm$^3$ in total, wherein there can be a deviation of up to 10%, in particular of up to 5%.

In contrast to the sleeve 30a which ends after the first contact surface 72, in the interior of the sleeve of FIGS. 8 to 12 the contact surface 72 is adjoined by a transition region 104 and the latter is adjoined by a second contact surface 106. If the sleeve 30 is produced by a plastics injection molding process, the second contact surface 106 preferably likewise does not have a mold release slope. A hollow 108 which extends over 1 mm in the longitudinal direction of the sleeve 30 is preferably formed between the second contact surface 106 and the first end side 64. The second contact surface 106 has a length 110 of 10 mm minus the length which is produced for the hollow 108, if present, as measured from the first end side 64. At this length 110, the diameter of the second contact surface 106 is constant and is 12.2 mm. The transition region 104 therefore has a resulting length of approximately 20 mm. The diameter of the transition region 104 lies between both of the first and second contact surfaces 72 and 106, that is to say, between 11.8 and 12.2 mm, for example 12 mm. In the present exemplary embodiment, the second contact surface 106 adjoins the first contact surface 72 with the interconnection of the transition region 104. However, the second contact surface 106 can also directly adjoin the first contact surface 72. In both cases, the second contact surface 106 therefore adjoins the first contact surface 72.

It should also be noted that the volume of the sleeve 30 is preferably 5.78 cm$^3$ overall, wherein there can be a deviation of up to 10%, in particular of up to 5%.

Figure 14:
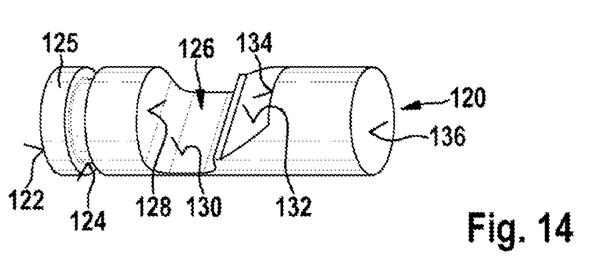
FIG. 14 shows a perspective view of a pin-shaped bearing device.

FIG. 14 shows a pin-shaped bearing device, also referred to below as pin 120, which is arranged in the longitudinal bore 56. The pin 120 supports the ball 34, as a result of which the pin 120 forms a locking device for the securing device 36, but this will also be discussed. The pin 120 has a length of 18 mm and a diameter of 5.9 mm and is preferably made from steel or plastic. Instead of the circular cross-sectional area, a different cross-sectional area, for example an oval or polygonal cross-sectional area, can also be provided. The pin 120 can taper in the longitudinal direction in a manner going away from a first end side 122. The tapering can run continuously and/or conically, but also with steps. The profile of the cross-sectional area of the pin 120 has to be adapted to the profile of the cross-sectional area of the longitudinal bore 56 of the shaft 20 such that, after assembly in the longitudinal bore 56, the pin 120 has a sliding fit and can be displaced over a certain distance.

An annular groove 124 which has a width of 1.2 mm and a depth from the outer circumference of the pin 120 of 0.7 mm runs at a distance of 1.4 mm from the first end side 122 of the pin 120. This results in a diameter of the annular groove 124 of 4.5 mm. A collar 125 is therefore produced between the first end side 122 and the annular groove 124.

A radially open pocket 126 is formed at a distance of 5.6 mm from the first end side 122. The pocket 126 has a side surface 128 running transversely with respect to the longitudinal axis of the pin 120. The side surface 128 is therefore at a distance of 5.6 mm from the first end side 122. The side surface preferably has a height of 4 mm, as measured from the outer circumference of the pin 120. That end of the side surface 128 which is remote from the outer circumference of the pin 120 is preferably rounded and has in particular a radius of 1 mm.

The side surface 128 is adjoined in the pocket 122 by a base surface 130. The base surface 130 preferably runs parallel to the longitudinal axis of the pin 120 and, owing to the height of the side surface 128, is at a distance of 4 mm from the outer circumference of the pin 120. The base surface 130 also ends at a radius of preferably 1 mm, and therefore the base surface 130 is substantially U-shaped, and a ramp 132 which is preferably inclined at an angle of 130° with respect to the longitudinal axis of the pin 120 adjoins the radius at a height of 1.3 mm above the base surface 130. The ramp 132 points away from the first end side 122. The ramp 132 points away from the base surface 130 with an increasing height over the base surface 130. The ramp ends after 3.25 mm, as seen in the longitudinal direction, and merges via a radial step 134 into the outer circumference of the pin 132. A second end side 136 is formed at the end opposite the first end side 122 of the pin 120. The two end sides 122 and 136 are preferably of flat design.

Figure 15:
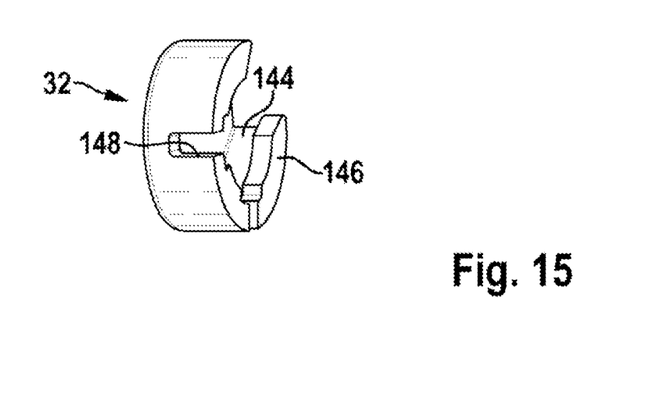
FIG. 15 shows a perspective view of an actuating cap.
Figure 16:
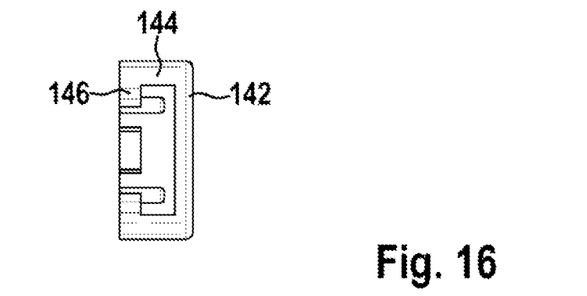
FIG. 16 shows a side view of the actuating cap.
Figure 17:
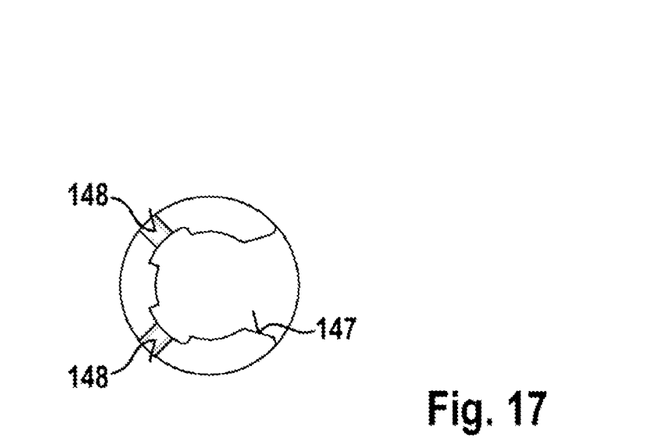
FIG. 17 shows a front view of the actuating cap.

FIGS. 15 to 17 show the cap 32 in detail. The cap 32 preferably has a diameter of 8.2 mm and a length of 3.3 mm. The cap 32 has a flat, substantially round end wall 142. The end wall 142 can have a central through hole (not shown). The end wall 142 is adjoined by a first section 144 which has a C-shaped cross-sectional form, wherein the outside radius corresponds to that of the end wall 142. The inside radius of the first section 144 is at least 2.95 mm. The first section 144 is adjoined by a second C-shaped section 146 which has an inside radius of 4.5 mm. The inside length of the first section 144 between the end wall 142 and the second section 146 is 1.4 mm. The inside radius is at least dimensioned in such a manner that the C-shaped section 146 can be clipped onto the annular groove 124. The two C-shaped sections 144 and 146 result in a radial mouth 147 via which the cap 32 can be latched laterally over the collar 123 of the pin. Two slots 148 running in the axial direction of the cap 32 divide the C-shaped sections 144 and 146, as a result of which the cap 32 can also be fastened when mounted on the pin 120. A cap 32 can also be adhesively bonded on the pin 120 or the latter can be insert molded with the cap 32. Other fastening possibilities are conceivable.

The cap 32 is preferably colored red or a different color which indicates to a person operating the machine tool 10 that the securing device 36 can be operated via the cap 32. The cap 32 can also be omitted. In this case, the end side 122 and/or the collar 123 can be provided with a red or other signaling color.

Alternatively, the first C-shaped section 144 can also be of hollow-cylindrical design without a lateral mouth 147. The second section 146 with the smaller inside radius would be omitted. The slots 148 could be present or could also be omitted. In this case, the cap 32 is pressed axially onto the region of the collar 123, wherein, in this case, the annular groove 124 can also be omitted.

Figure 18:
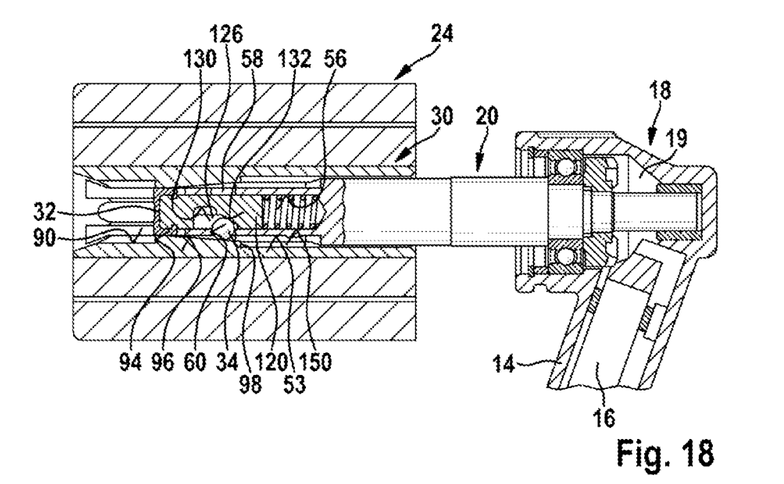
FIG. 18 shows a longitudinal section through the grinding roller and shaft during the mounting.

The assembly of the shaft 20, the cap 32, the ball 34, the pin 120 and a spring 150 is now explained with the aid of FIG. 18. It is possible to mount the shaft 20 into the receptacle 19 of the drive head 18 before or after this assembly. However, the shaft 20 should preferably be mounted onto the machine tool 10 before the assembly since it is easier to press on.

For the assembly, the ball 34 is placed into the pocket 126, in particular onto the base surface 128 of the pin 120. As a result, the securing device 36 is at least partially preassembled. The spring 150 is inserted into the longitudinal groove 56 of the shaft 20. However, the spring 150 can also be fastened to the pin 120 beforehand and can be introduced together therewith into the longitudinal bore 56. The securing device 36 is pushed into the longitudinal bore 56 or shaft 20 counter to the spring force of the spring 150 in such a manner that the ball 34 comes into the region of the first opening 60. The assembly then has to be oriented in such a manner that the ball 34 protrudes through the opening 60 and bears against the ramp 132. The pin 120 can then be released. The spring 150 presses here against the pin 120 which moves somewhat out of the bore 56. The ramp 132 then presses against the ball 34 which, in turn, presses against the opening 60. As a result, the securing device 36 is held in the shaft 20. The force of the spring 150 therefore acts in such a manner that the securing device 36 presses in the direction out of the first end 31 of the shaft 20 and that the securing device 36 is held in the shaft 20 by the ball 34 or the blocking device. In the installed state, the force of the spring 150 is 5-20 N, preferably 10 N. In addition to a spring 150, the use of a magnet which can apply a force to the pin 120 is also conceivable, but the spring 150 is preferred.

The assembly consisting of shaft 20, ball 34, pin 120, and spring 150 can also be mounted without a cap 32. If a cap 32 is mounted, which is preferred, said cap is now placed onto the pin 120. As a result, the pin 120 can no longer be pressed into the bore 56 to an extent such that the ball 34 can rest completely on the base surface 130. This constitutes a better securing of the securing device 36 against removal. However, it is also possible to place the cap 32 onto the pin 120 after the mounting of the assembly consisting of shaft 20, ball 34, pin 120 and spring 150.

It is now also clear that the ball 34 is movable radially with respect to the outer circumference of the shaft 20 by means of the ramp 132, specifically by means of the increasing distance of the ramp 132 from the second end 37 to the first end 31 of the shaft 20, as a result of which, when the pin is displaced in the shaft 20 from the first end 31 to the second end 37, the blocking device can move away from the outer circumference.

The securing device 36 is then fastened in the longitudinal bore 56 emerging from the end side of the first end 31 of the shaft 20 or in a differently designed axial recess which has already been described above. The longitudinal bore 56 preferably extends over the length of the pin 120 in the installed state and additionally over the displacement travel of the pin 120 into the longitudinal bore 56. As already described, the two cross-sectional areas can also taper.

In the assembled state, it is also now shown more clearly that the securing device 36 preferably comprises only one ball 34 or other blocking device protruding from one of the groove bases 52 although a plurality of grooves 50.1, 50.2, 50.3, 50.4 are arranged on the shaft 20. It is also possible for the pin 120 to be of longer design and to have a plurality of pockets 126 one behind another for balls 24. If the shaft 20 has a larger diameter, the pockets 126 and balls 34 can be arranged distributed at the same height on the circumference.

When the roller 24 is mounted onto the shaft 20, the sleeve 30 is guided by the mounting opening 68 over the first end 31 of the shaft 20. Instead of the sleeve 30, it is, of course, also possible for the sleeve 30a to be placed onto the shaft 20. Only the sleeve 30 is mentioned below for the purposes of the description. However, the mounting of the sleeve 30a is analogous. The webs 39.1, 39.2, 39.3, 39.4 are oriented with respect to the grooves 50.1, 50.2, 50.3, 50.4 in such a manner that each web 39.1, 39.2, 39.3, 39.4 is aligned with a respective groove 50.1, 50.2, 50.3, 50.4. This is simpler because of the four webs 39.1, 39.2, 39.3, 39.4 and grooves 50.1, 50.2, 50.3, 50.4 which are in each case present than with a smaller number. The sleeve 30 is then pushed further onto the shaft 20. When the step 98 of the ramp 96 reaches the ball 34, the step presses the latter against the ramp 132 of the pin 120. Since the ball 34 is guided in the bore 60, the ball is pressed radially inward into the longitudinal bore 56. In the process, the pin 120 is pressed in the axial direction via the force acting on the ramp 132 into the longitudinal bore 56 counter to the spring force of the spring 150. When the roller 24 or sleeve 30 is pushed further onto the shaft 20, the ball 34 is pressed via the ramp 96 of the sleeve 30 into the bore 60 until the highest point of the ramp 96 is reached. This is the case in the region of the wall 94.

Figure 19:
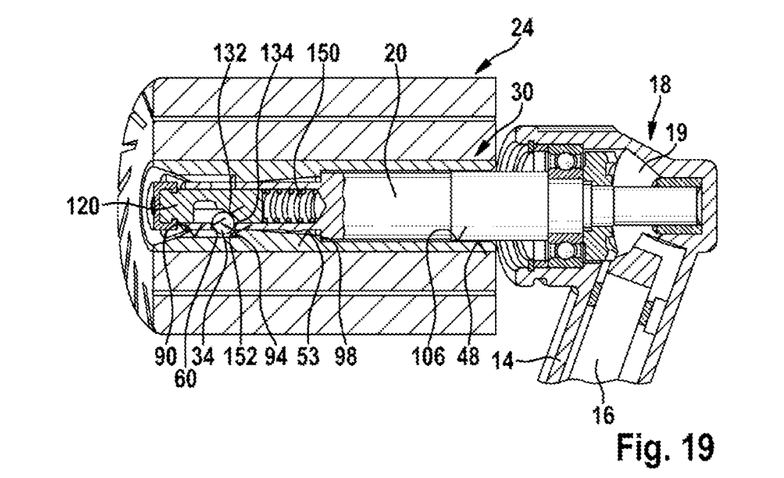
FIG. 19 shows a longitudinal section through the grinding roller and shaft in a mounted state.

If the roller 24 or sleeve 30 is pushed further onto the shaft 20, the ball 34 protrudes from the groove base 52. The ball 34 protrudes behind the wall 94 into the groove 90, which is shown in FIG. 19. A section which can be referred to as the retaining section 152 of the ball 34 comes into contact with the wall 94. The retaining section 152 here has a radial excess length with respect to the groove base 53 or with respect to an outer surface of the shaft 20, which outer surface is adjacent to the ball 34. It is therefore clear that the ball 34 or blocking device has a radially protruding retaining section 152 for the sleeve 30 or device which is mounted on the shaft 20 and can be guided through the hollow receiving region 38 when the sleeve 30 is mounted.

In addition to the ball 34 which comes into contact with the wall 94, the steps 98 of the webs 39.1, 39.2, 39.3, 39.4 also come into contact with the groove ends 53 of the grooves 50.1, 50.2, 50.3, 50.4. The sleeve 30 is clamped in the axial direction on the shaft 20 between the ball 34 or the retaining section 152 thereof and a groove end 53 of at least one groove 50.1, 50.2, 50.3, 50.4. The sleeve 30 is now also locked on the shaft 20, wherein the locking has taken place automatically. The automatic locking is achieved by the ball 34 being pressed radially outward with a force acting transversely with respect to the longitudinal bore 56 by the ramp 132 of the pin 120, which is acted upon by the spring 150. The ball 34 is thus held in the locked state by means of an elastic force. If it is desired to pull the sleeve 30 from the shaft 20, the wall 94 presses against the retaining section 152 or the ball 34. The ball 34 is pressed here against the edge of the bore 56 by a section 154 remote from the retaining section 152. However, the ball 34 cannot be deflected inward such that the locking comes about.

In the mounted state, the first contact surface 72 of the sleeve 30 rests on the first supporting region 46 of the shaft 20, and the second contact surface 106 of the shaft rests on the second supporting region 48 of the shaft 20. In the case of the sleeve 30a, only the contact surface 72 rests on the first supporting region 46 of the shaft 20. The grooves 50.1, 50.2, 50.3, 50.4 of the shaft 20 receive the webs 39.1, 39.2, 39.3, 39.4 of the sleeve 30. If the shaft 20 is driven, the side surfaces 54 of the four grooves 50.1, 50.2, 50.3, 50.4 press against the side walls 87 of the four webs 39.1, 39.2, 39.3, 39.4. As a result, a relatively high torque can be transmitted. The grooves 50.1, 50.2, 50.3, 50.4 constitute torque-transmitting sections of the shaft 20, which sections can be arranged in the hollow receiving region 38 of the sleeve 30.

An advantageous aspect is therefore that a blocking device, for example in the form of the ball 34, is arranged on the securing device 36, said blocking device, in a locked state, blocking the sleeve 30 or 30a against removal from the shaft 20 and, in an unlocked state, enabling removal of the sleeve 30 or 30a for the shaft 20. It is also advantageous that a locking device which is preferably designed as a pin 120 is arranged on the securing device 36, with which locking device the ball 34 can be unlocked or with which the ball 34 can be unlocked and can be locked, wherein the pin 120 is arranged at the first end of the shaft 20.

It is also apparent from the described mounting that the pin 120 or the blocking device can be unlocked manually and is automatically locked, but also, in the locked state, permits the mounting of a sleeve 30 or 30a or of a tubular device.

Figure 20:
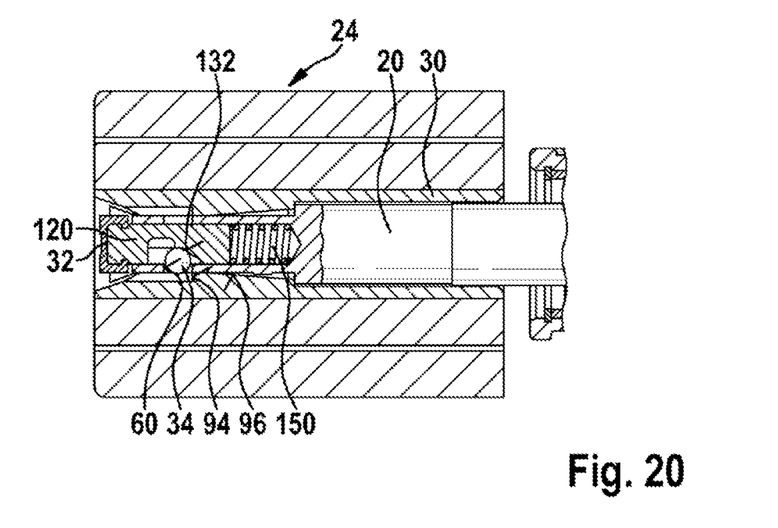
FIG. 20 shows a longitudinal section through the grinding roller and shaft in a first state during the removal.

The removal is clear from FIG. 20. In this connection, the securing device 36 is transferred from the locked into the unlocked state by axial pressing of the cap 32 against the shaft 20. The pin 120 is pressed into the longitudinal bore 56 counter to the spring force of the spring 150. In the process, the ramp 132 of the pin 120 is also displaced. As a result, the ball 34 has space radially inward. If the roller 24 or the sleeve 30 or 30a is then pulled from the shaft 20, the ball 34 of the wall 94 and of the ramp 96 can be deflected. The roller 24 can then be completely removed from the shaft 20. An advantageous aspect of the removal is that, at least during the removal of a roller 24 or sleeve 30 or 30a mounted on the shaft 20, the securing device 36 remains on the shaft 20. However, owing to the axial displacement travel of the pin 120 arising because of the cap 32, the ball 34 cannot penetrate into the longitudinal bore 56 to such an extent that an unintentional removal of the pin 120 or of the securing device 36 is possible.

It is clear from the explained exemplary embodiment that the securing device 36 takes up a locking position in the locked state and an unlocking position in the unlocked state and that the locking position and the unlocking position are spaced apart radially on the shaft 20. This is achieved by the ball 34 being kept in the position thereof in the locked state and being able to be deflected inward in the unlocked state.

Alternatively, it is also possible for the pin 120 to have an external thread and for the longitudinal bore 56 to have a matching internal thread. If the pin is screwed into the shaft 20, the ball 34 can be deflected inward. As a result, the ball 34 is unlocked manually. A sleeve 30 or 30a can then be mounted. The pin 120 can then be unscrewed out of the shaft 20 to an extent such that the ball 34 is pressed radially outward via the ramp 132 until the ball 34 clamps the sleeve 30 or 30a. As a result, the sleeve 30 or 30a is locked manually. The pin 120 here is preferably rotated by less than 360°, which reduces the time needed for the locking and unlocking. The pin 120 is preferably rotated by approximately 180°. As a result, the time needed for the locking and unlocking is reduced, wherein the locking or unlocking operation is imparted to an operator sufficiently intuitively.

It is also conceivable for a modified pin to be mounted rotatably in the longitudinal bore 56 and to be pressed in one direction via a torsion spring. A pocket then has a base which has a change in distance from the center axis. As a result, a rotating movement of the pin can bring about locking and unlocking.

It is therefore apparent from the described embodiments that a securing device can be transferred from the locked into the unlocked state by axial pressing of an actuating element against the shaft or rotation of the actuating element about a longitudinal axis of the shaft.

It is likewise apparent that a securing device takes up a locking position in the locked state and an unlocking position in the unlocked state, and that the locking position and the unlocking position can be spaced apart radially and/or tangentially and/or axially on the shaft.

The invention claimed is:

1. A tubular device for connection to a shaft such that a torque can be transmitted between the tubular device and the shaft, comprising:
   a hollow receiving region configured to receive a first supporting region of the shaft, and including at least one contact surface configured to engage at least one first supporting region of the shaft when the tubular device is radially mounted to the shaft;
   at least one first torque-transmitting section configured to engage with a corresponding at least one second torque-transmitting section of the shaft, the at least one first torque-transmitting section including at least one bump which, starting from the at least one contact surface, projects into the hollow receiving region and is positioned immovably on the tubular device, wherein the at least one bump is configured as a web running along an inner circumference defined in the tubular device and in a longitudinal direction of the tubular device, and the at least one bump is formed integrally with the tubular device; and
   a groove running in the longitudinal direction of the tubular device formed in a surface of the at least one bump facing a center axis of the tubular device, the groove running over part of a length of the at least one bump,
   wherein the depth of the groove is smaller than a height of the at least one bump.

2. The tubular device as claimed in claim 1, wherein the at least one bump runs over at least part of an overall length of the tubular device.

3. The tubular device as claimed in claim 1, wherein the at least one bump comprises a main section which is at a distance from a first end side of the tubular device and has a length that runs only over part of the overall length of the tubular device.

4. The tubular device as claimed in claim 3, wherein the length of the main section is 14.95 mm.

5. The tubular device as claimed in claim 1, wherein:
the at least one bump, begins at a transition from a first end side to the hollow receiving region; and
the transition includes a hollow.

6. The tubular device as claimed in claim 1, wherein the groove ends in a wall, wherein the wall runs in a plane which lies perpendicularly to the longitudinal direction of the tubular device, and forms a stop for a securing device positioned on the shaft.

7. The tubular device as claimed in claim 1, wherein the at least one bump comprises at least two bumps that are positioned on the inner circumference and divide the at least one contact surface into partial surfaces of identical size.

8. The tubular device as claimed in claim 1, further comprising:
at least one blocking device positioned on an inner circumference of the tubular device and configured to prevent mounting the tubular device to the shaft with a wrong orientation with respect to the shaft, the blocking device located at a first end side of the tubular device that is opposite an end of the tubular device configured as a mounting opening.

9. The tubular device as claimed in claim 1, wherein:
the at least one contact surface of the hollow receiving region has a diameter of 11.8 mm;
the at least one bump has a width of 4.95 mm; and
the at least one bump includes diametrically opposite webs spaced apart by a distance of 8.65 mm.

10. The tubular device as claimed in claim 1, wherein the tubular device is an injection molded plastics part without a mold release slope formed on the at least one contact surface.

11. The tubular device as claimed in claim 1, wherein the tubular device comprises a tool configured as a roller, saw or grinding wheel.

12. The tubular device as claimed in claim 1, wherein the at least one bump comprises at least three bumps that are positioned on the inner circumference and divide the at least one contact surface into partial surfaces of identical size.

13. The tubular device as claimed in claim 1, wherein the at least one bump comprises at least four bumps that are positioned on the inner circumference and divide the at least one contact surface into partial surfaces of identical size.

14. The tubular device as claimed in claim 1, wherein the tubular device comprises an adapter for a further tool.

15. A tubular device for connection to a shaft such that a torque can be transmitted between the tubular device and the shaft, comprising:
a hollow receiving region configured to receive a first supporting region of the shaft, and including at least one contact surface configured to engage at least one first supporting region of the shaft when the tubular device is radially mounted to the shaft; and
at least one first torque-transmitting section configured to engage with a corresponding at least one second torque-transmitting section of the shaft, the at least one first torque-transmitting section including at least one bump which, starting from the at least one contact surface, projects into the hollow receiving region and is positioned immovably on the tubular device
wherein:
the at least one bump is configured as a web running along an inner circumference defined in the tubular device and in a longitudinal direction of the tubular device;
the at least one bump is formed integrally with the tubular device;
the at least one bump comprises a main section which is at a distance from a first end side of the tubular device and has a length that runs only over part of the overall length of the tubular device; and
a ramp is formed in the main section, the ramp being inclined in a direction away from a center axis of the tubular device at an increasing axial distance from the first end side, the ramp merging into the at least one contact surface via a step.

16. The tubular device as claimed in claim 15, wherein:
the at least one contact surface has a constant diameter over a length thereof up to a region with the at least one bump; and
the at least one contact surface is directly or indirectly adjoined in the longitudinal direction of the tubular device by a second contact surface having a constant diameter.

* * * * *